US012806623B2

(12) United States Patent
Wu et al.

(10) Patent No.: US 12,806,623 B2
(45) Date of Patent: Nov. 24, 2026

(54) ASSEMBLY FOR INCUBATING AND WASHING BIOLOGICAL SAMPLES AND METHODS USING THEREOF

(71) Applicants: Rongrong Wu, El Sobrante, CA (US); Guofu Wang, Wuhan (CN); Suheng Liu, Wuhan (CN)

(72) Inventors: Rongrong Wu, El Sobrante, CA (US); Guofu Wang, Wuhan (CN); Suheng Liu, Wuhan (CN)

( * ) Notice: Subject to any disclaimer, the term of this patent is extended or adjusted under 35 U.S.C. 154(b) by 571 days.

(21) Appl. No.: 18/484,444

(22) Filed: Oct. 10, 2023

(65) Prior Publication Data

US 2024/0116056 A1 Apr. 11, 2024

(30) Foreign Application Priority Data

Oct. 10, 2022 (CN) ......................... 202211238031.1

(51) Int. Cl.
*B01L 3/00* (2006.01)

(52) U.S. Cl.
CPC ......... *B01L 13/00* (2019.08); *B01L 2200/025* (2013.01); *B01L 2300/047* (2013.01); *B01L 2300/049* (2013.01); *B01L 2300/0816* (2013.01); *B01L 2300/0867* (2013.01); *B01L 2400/0605* (2013.01)

(58) Field of Classification Search
CPC ............. B01L 2300/0867; B01L 13/00; B01L 2300/04
See application file for complete search history.

(56) References Cited

U.S. PATENT DOCUMENTS

| | | | | |
|---|---|---|---|---|
| 4,822,742 A * | 4/1989 | Challberg | B01L 3/508 | 435/291.1 |
| 5,100,626 A * | 3/1992 | Levin | G01N 33/54366 | 422/420 |
| 5,436,129 A * | 7/1995 | Stapleton | B01L 3/5027 | 436/515 |
| 6,446,807 B1 * | 9/2002 | Lafond | B65D 85/48 | 206/509 |
| 6,485,918 B1 * | 11/2002 | Schermer | B01L 3/50853 | 366/267 |
| 7,977,086 B2 * | 7/2011 | Einsle | B01L 3/502707 | 435/303.1 |
| 2005/0196761 A1 * | 9/2005 | Thompson | B01L 3/508 | 435/6.19 |
| 2007/0140920 A1 * | 6/2007 | McCormick | G01N 1/36 | 422/400 |

* cited by examiner

*Primary Examiner* — Nathan A Bowers

(57) ABSTRACT

The present disclosure provides an assembly for incubating and washing a protein blotting membrane. The assembly comprises an incubation cover and an incubation tank, wherein a cavity for accommodating the protein blotting membrane and the solution is formed between the incubation cover and the incubation tank. The solution moves over the surface of the protein blotting membrane when there is a relative motion between the incubation cover and the incubation tank.

11 Claims, 11 Drawing Sheets

ASSEMBLY FOR INCUBATING AND WASHING BIOLOGICAL SAMPLES AND METHODS USING THEREOF

CROSS REFERENCE

This present disclosure claims the benefits of Chinese Patent Application No. 202211238031.1, filed Oct. 10, 2022, which is herein incorporated by reference in its entirety.

BACKGROUND OF THE INVENTION

Biological experiments require processing membranes or gels containing biological sample. Biological samples may include deoxyribonucleic acid (DNA), ribonucleic acid (RNA), sugar, lipid, protein, etc. The processing methods may be nucleic acid hybridization, detection using antibodies, and staining, etc.

Take Western blot or protein immunoblot as an example, the traditional Western blot methods have been around for more than 40 years. The process includes incubating the protein-immobilized membrane with antibodies and then washing the membrane. In the lab, manual labor is required to perform Western blot experiments. When the western blotting membrane is washed by using an open box-shaped container, in order to ensure that the incubation/washing solution is sufficiently contacted with the western blotting membrane and that the western blotting membrane is not dried due to the exposure to air, a large amount of antibody solution and washing solution is added to ensure the surface of the western blotting membrane is covered by the solutions.

Automated incubation/washing machines for western blotting membranes include BenchPro™ from Invitrogen. The machine is characterized in that the western blotting membrane is arranged in a disposable plastic box with a fixed volume. Then the disposable plastic box is inserted into a slot in the machine, solutions are automatically introduced into or removed from the box, thereby incubation/washing the membrane; also common are machines of eZwest™ Lite western blotting device. This machine is characterized in that the western blotting membrane is arranged in a plastic box with fixed volume and the plastic box can be used for a plurality of times. But the plastic box needs to be cleaned repeatedly, and the solution in the box is automatically changed in sequence under the control of a host machine to realize the automatic incubating/washing cycle.

In both machines, the western blotting membrane is arranged in a plastic box with a fixed volume, and the incubation solution and the washing solution are thoroughly mixed and then fully cover the surface of the western blotting membrane for the blotting process to work. For incubation/washing a 70 mm×90 mm western blot membrane, the aforementioned machines recommend 14 mL and 10 mL antibody doses, respectively.

SUMMARY OF THE INVENTION

The invention relates to an instrument device for a medical laboratory or a biological laboratory, in particular to a component for incubation and washing of a protein blotting membrane.

The invention provides a component for incubating and washing a protein blotting membrane, which comprises a jet flow incubating and washing cover and a jet flow incubating and washing tank, wherein a gap cavity for accommodating the protein blotting membrane and solution is formed between the jet flow incubating and washing cover and the jet flow incubating and washing tank, the jet flow incubating and washing cover and the jet flow incubating and washing tank can move relatively to change the volume of the gap cavity, and the change of the volume further drives the solution in the gap cavity to extrude the solution to flow into and out of the gap cavity, so that the solution jet flow is formed to impact the protein blotting membrane. The invention can solve the problem of uniformly mixing the solution in a narrow space, and not only can comprehensively soak the western blotting membrane, but also can fully mix the incubation washing solution, thereby reducing the use amount of the incubation washing solution to a smaller amount.

One aspect of the present disclosure provides a needleless injection device, comprising: a housing; a first slider disposed in the housing and movable along an axis; a second slider disposed in the housing and movable along the axis; an ampoule injection tube; and a driving unit configured to move the first slider and the second slider in opposite directions along the axis, characterized in that the value of the combined momentum of the first slider and the second slider is substantially zero under the control of the driving unit.

In some embodiments of aspects provided herein, the device further comprises: a piston configured to slide inside the ampoule injection tube and interact with the first slider, the second slider, or both the first and second slider.

In some embodiments of aspects provided herein, the device further comprises: a center injection shaft attached to the second slider and configured to interact with the piston, wherein the center injection shaft is configured to contact the piston when the second slider moves away from the first slider; or an overhead injection shaft attached to the first slider and configured to interact with the piston, wherein the other injection shaft is configured to contact the piston when the first slider moves toward the second slider.

In some embodiments of aspects provided herein, the driving unit further comprises a momentum spring between the first slider and the second slider, the housing comprises: a first opening on one end of the housing along the axis; a second opening on the other end of the housing along the axis; an attached first steel marble; and an attached second steel marble; wherein the first slider is a first disk comprising a first curved surface, and there is a first groove on the first curved surface; wherein the first groove is configured to mate with the attached first steel marble when the momentum spring is compressed; wherein the second slider is a second disk comprising a second curved surface, and there is a second groove on the second curved surface; and wherein the second groove is configured to mate with the attached second steel marble when the momentum spring is compressed.

In some embodiments of aspects provided herein, the driving unit further comprises a momentum spring between the first slider and the second slider; the first slider comprises a first rod pointing outward and perpendicular to the axis, the first rod is configured to move the first slider along the axis; the second slider comprises a second rod pointing outward and perpendicular to the axis, the second rod is configured to move the second slider along the axis; the first rod and the second rods are on the same side relative to the first slider and the second slider, and aligned substantially within in a plane comprising the axis; the needleless injection device further comprises: a rotatable shaft comprising a curved surface comprising a symmetric groove, wherein the symmetric groove is configured to engage with the first and second rod, thereby moving the first and second rod along the axis when the rotatable shaft is rotated, wherein the symmetric groove comprises: a first nadir, a first apex, a second apex, and a second nadir sequentially along a second axis in that order; wherein the second axis parallels the first axis; wherein the first nadir and the first apex are connected with a first plane comprising the second axis and a first spiral plane revolving a rotational axis for the shaft; and wherein the second nadir and the second apex are connected with a second plane comprising the second axis and a second spiral plane revolving the rotational axis for the shaft; and a gear motor configured to rotate the rotatable shaft. In some embodiments of aspects provided therein, the rotatable shaft further comprises sound-absorbing materials near the first nadir and the second nadir.

In some embodiments of aspects provided herein, the driving unit further comprises: a first positioning spring between the first slider and the second slider; a second positioning spring between the first slider and one end of the housing; a third positioning spring between the second slider and the other end of the housing; an inlet in fluid communication with a first space surrounding the first positioning spring; a first outlet in fluid communication with a second space surrounding the second positioning spring; and a second outlet in fluid communication with a third space surrounding the third positioning spring.

In some embodiments of aspects provided herein, the driving unit further comprises: a first electromagnet affixed inside the housing and disposed between the first slider and one end of the housing; and a second electromagnet affixed inside the housing and disposed between the second slider and the other end of the housing, thereby the first slider and the second slider are disposed between the first electromagnet and the second electromagnet; wherein the first slider comprises a first permanent magnetic core with a first connection rod configured to slide through the hollow center of the first electromagnet; wherein a first buffer spring is disposed between the first permanent magnetic core and the first electromagnet; wherein the second slider is a second permanent magnetic core connected to the center injection shaft through the hollow center of the second electromagnet; and wherein a second buffer spring is disposed between the second permanent magnetic core and the second electromagnet.

In some embodiments of aspects provided herein, the driving unit further comprises: a connection disk disposed inside the housing and connected with a center injection shaft pointing toward the piston; an upper connection arm connecting the connection disk with the first slider; a lower connection arm connecting the connection disk with the first slider; a first voice coil configured to become a first electromagnet, the first voice coil disposed between the first slider and the second slider; a second voice coil configured to become a second electromagnet, the second voice coil disposed between the first voice coil and the second slider; the first slider comprises a first permanent magnet; and the second slider comprises a second permanent magnet.

In some embodiments of aspects provided herein, the driving unit further comprises: a pouch disposed between the first slider and the second slider, the pouch comprising an outlet and a fluid, wherein the pouch is configured to engage with the center injection shaft via the fluid.

In some embodiments of aspects provided herein, the device further comprises: a medicine storage container; a pouch disposed between the first slider and the second slider, the pouch comprising: an inlet; and an outlet; a first conduit connecting the medicine storage container with the inlet of the pouch via a first check valve; and a second conduit connecting the outlet of the pouch with the ampoule injection tube via a second check valve.

In some embodiments of aspects provided herein, the ampoule injection tube is along the axis, and wherein the second slider is positioned between the first slider and the piston.

In some embodiments of aspects provided herein, the ampoule injection tube is not along the axis.

Another aspect of the present disclosure provides a needleless injection device, comprising: a housing; a first slider disposed in the housing and movable along an axis; a second slider disposed in the housing and movable along the axis; and an ampoule injection tube substantially perpendicular to the axis, the ampoule injection tube comprising: a chamber disposed between the first and second sliders; a lower check valve in fluid communication with the chamber; and an ampoule injection port in fluid communication with the lower check valve; a first striking core movable along the axis and configured to engage with the chamber of the ampoule injection tube, wherein the first striking core is between the first slider and the chamber; a second striking core movable along the axis and configured to engage with the chamber of the ampoule injection tube, and wherein the second striking cores is between the chamber and the second slider; and a driving unit configured to move the first slider and the second slider in opposite directions along the axis; wherein the first slider is configured to engage with the first striking core, wherein the second slider is configured to engage with the second striking core.

In some embodiments of aspects provided herein, the device further comprises: a medicine storage container in fluid communication with the ampoule injection tube via an upper check valve.

Still another aspect of the present disclosure provides a needleless injection device, comprising: a housing; a first slider disposed in the housing and movable along an axis; a second slider disposed in the housing and movable along the axis; and an ampoule injection tube substantially perpendicular to the axis, the ampoule injection tube comprising: a chamber disposed between the first and second sliders; an expandable pouch disposed in the chamber; a pressure-limit valve in fluid communication with the pouch; and an ampoule injection port in fluid communication with the pressure-limit valve; a first striking core movable along the axis and configured to engage with the expandable pouch, wherein the first striking core is between the first slider and the expandable pouch; a second striking core movable along the axis and configured to engage with the expandable pouch, and wherein the second striking cores is between the expandable pouch and the second slider; and a driving unit configured to move the first slider and the second slider in opposite directions along the axis; wherein the first slider is configured to engage with the first striking core, wherein the second slider is configured to engage with the second striking core.

In some embodiments of aspects provided herein, the device further comprises: a medicine storage container; and a needle in fluid communication with the medicine storage container; wherein the needle is in fluid communication with the expandable pouch via an upper check valve.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

FIG. 4A shows the incubation cover reaches the far left position inside the incubation tank. FIG. 4B shows the incubation cover starts to move rightward inside the incubation tank. FIG. 4C shows the incubation cover reaches the far right position inside the incubation tank and is lifted up relative to the incubation tank;

Figure 1:
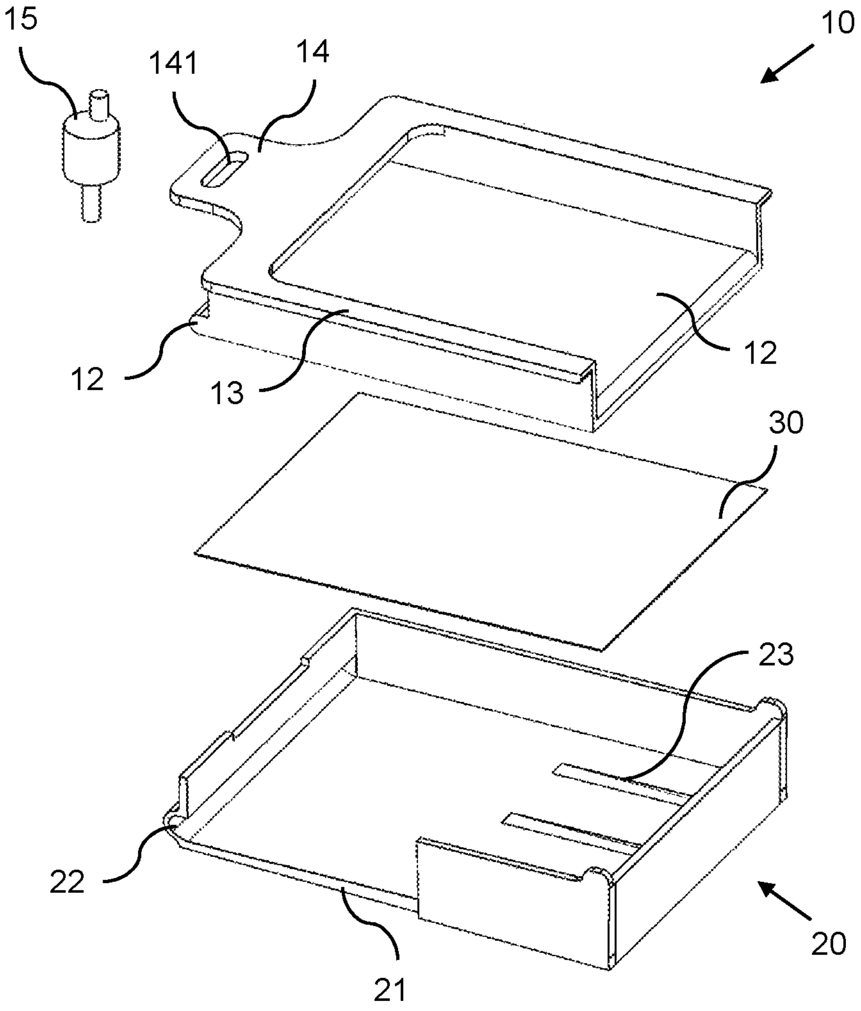
FIG. 1 is a schematic exploded view of a first example incubation assembly of the present disclosure.

Before proceeding with the detailed description, it is to be appreciated that the following detailed description is merely exemplary in nature and is not intended to limit the invention or the application and uses thereof. Hence, although the present disclosure is, for convenience of explanation, depicted and described as shown in certain illustrative embodiments, it will be appreciated that it can be implemented in various other types of embodiments and equivalents, and in various other systems and environments. Furthermore, there is no intention to be bound by any theory presented in the preceding background or the following detailed description.

INCORPORATION BY REFERENCE

All publications, patents, and patent applications mentioned in this specification are herein incorporated by reference to the same extent as if each individual publication, patent, or patent application was specifically and individually indicated to be incorporated by reference.

DETAILED DESCRIPTION OF THE INVENTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Numerals

Number Name
10 incubation cover
11 flat panel
12 convex-shaped head
13 side panel with widen edge
14 traction hole section
141 traction hole
15 eccentric shaft
16 first water channel
17 wedge-shaped side panel
18 sealing film
19 air pump connector
20 incubation tank
21 sloped bottom
22 concave-shaped head
23 second water channel
24 side edge protrusion
25 solution inlet
26 solution outlet
27 incubation tank side panel
28 wedge-shaped side panel
30 western blot membrane
40 wedge-shaped moving block
41 wedged sidewall
50 gap cavity
60 antibody container
60A $1^{ST}$ antibody container
60B $2^{ND}$ antibody container
61 solution conduit
62 air conduit
63 filtration membrane
64 U-shaped tube
70 antibody recovery container
80 washing fluid container
90 waste container
92A solution inlet
92B solution inlet
94A gas pump connector
94B gas pump connector
102 gas pump connector
104 solution outlet
112A gas pump connector
112B gas pump connector
112C gas pump connector
112D gas pump connector
114B solution inlet
114C solution inlet
114D solution inlet
116 waste outlet
120 Tesla valve-shaped water channel
122 $1^{st}$ flow direction
124 $2^{nd}$ flow direction
130 assembly
132 incubation cover
1322 magnetic metal plate
134 western blot membrane
136 incubation tank
138 electromagnetic coil

Definitions

As used herein, the "present disclosure" or "present application" refers to any one of the embodiments of the disclosure described herein, and any equivalents thereof. Furthermore, reference to various feature(s) of the "present disclosure" or "present application" throughout this document does not mean that all claimed embodiments or methods must include the referenced feature(s).

As used herein, the singular forms "a," "an" and "the" include plural referents unless the context clearly dictates otherwise. Thus, for example, reference to "a molecule" includes a plurality of such molecules, and the like.

The term "about" or "nearly" as used herein generally refers to within +/−15%, 10%, 9%, 8%, 7%, 6%, 5%, 4%, 3%, 2%, or 1% of the designated amount.

As used herein, the term "substantially" generally refers to the qualitative condition of exhibiting total or near-total extent or degree of a characteristic or property of interest. One of ordinary skill in the mechanical arts will understand that mechanical phenomena rarely, if ever, go to completion and/or proceed to completeness or achieve or avoid an absolute result. The term "substantially" is therefore used herein to capture the potential lack of completeness inherent in many mechanical phenomena.

To appreciate the features and advantages of preferred apparatuses and methods in accordance with the present disclosure, the reader is referred to the appended FIGS. 1-13 in conjunction with the following discussion. It is to be understood that the drawings are diagrammatic and schematic representations only and are neither limiting of the scope of the present disclosure nor necessarily drawn to scale. Unless stated otherwise, the same numeral refers to the same element in the specification and drawings of the present disclosure.

The invention aims to provide a component for incubating and washing a protein blotting membrane, which allows uniformly mixing solution in a narrow space, substantially if not totally soaking the protein blotting membrane, and thoroughly mixing the incubation/washing solutions, thereby reducing the amount of the incubation/washing solution used in the process.

In one aspect, the present disclosure provides an assembly for incubating and washing western blotting membrane. The assembly comprises an incubation cover and an incubation tank, wherein a gap cavity between the incubation tank and the inserted incubation cover receives and accommodates a western blotting membrane and the incubation/washing solution. In addition, the volume of the gap cavity can be changed by the relative movement between the incubation cover and the incubation tank, so that the change in the volume of the gap cavity drives the incubation/washing solution in the gap cavity, for example, squeezing the solution into and out of the gap cavity, and forcing the solution flowing over the surface of the western blotting membrane.

In some embodiments, the assembly places the incubation cover inside incubation tank like two stacked bowls. In some embodiments, the bottom of the incubation cover is a flat panel. On two opposing sides of the flat panel are two opposing side panels with widened edges extending vertically from the flat panel (assuming the flat panel is horizontal).

In some embodiments, the incubation tank comprises a sloped bottom, and four incubation tank sidewalls. The four incubation tank sidewalls together with the sloped bottom form a void with an opening to receive the incubation cover. The depth of the void and the height of the two side panels are configured to allow the widened edges of the side panels to rest on the incubation tank sidewalls and to form a gap cavity between the bottom of the incubation cover and the bottom of the incubation tank. For example, the height of the side panel is shorter than the depth of the void. The gap cavity can receive and accommodate the western blotting membrane and the incubation/washing solution. The volume of the gap cavity may change depending on the relative movement of the incubation cover and the incubation tank. The volume of the gap cavity can also change by adjusting the difference between the depth of the void and the height of the two side panels.

In some embodiments, there are water channels on the bottom surface of the flat panel of the incubation cover, and the water channels are facing the sloped bottom of the incubation tank. There are also water channels on the top surface of the sloped bottom, and the water channels are facing the bottom surface of the flat panel. In some embodiments, these water channels are one-way water channels based on the Tesla valve principle. In some embodiments, the flow direction of the two types of water channels are the opposite such that the solution within the gap cavity can internally circulate when there is relative movement between the incubation cover and the incubation tank.

In some embodiments, the relative movement between the incubation cover and the incubation tank is a horizontal movement.

In some embodiments, the incubation cover comprises a convex-shaped head extending from the flat panel. In a substantially matching fashion, the incubation tank comprises a concave-shaped head extending from the sloped bottom, such that when the incubation cover moves inside the incubation tank, the convex-shaped head may move substantially freely into and out of the concave-shaped head. For example, one configuration can be that the space provided by the concave can be bigger enough to accommodate the convex but cannot be in a locked position easily (e.g., not a complete match between the convex-concave shapes).

In some embodiments, the end sidewall distal to and opposing the concave shaped head on the incubation bank comprises a side edge protrusion such that when the widened edge of the incubation cover is sliding over the side edge protrusion, the incubation cover (and its flat panel) moves up vertically relative to the sloded bottom of the incubation tank, thereby enlarging the volume of the gap cavity. If the incubation cover moves backwards and stops engaging with the side edge protrusion, the volume of the gap cavity may decrease.

In some embodiments, the relative motion between the incubation cover and the incubation tank is a vertical movement.

In some embodiments, the incubation cover further comprises a wedge-shaped moving block matching the shape of the sidewalls of the incubation cover. For example, the wedge-shaped moving block comprises two opposing sidewalls (vertically standing wedged sidewalls) that are wedge-shaped while the matching side panels of the incubation cover comprising protrusions on their outside wall that are also wedge-shaped but have a different wedge direction (i.e., the direction from the lowest point to the highest point). After the incubation cover is inserted into the incubation tank, the wedge-shaped moving block may be placed under both the incubation cover and the incubation tank and engage with the incubation cover and move the incubation cover vertically relative to the sloped bottom of the incubation tank, thereby changing the volume of the gap cavity according (enlarging or decreasing). Due to the size differentials discussed previously, there is a gap cavity between the incubation cover and the incubation tank. The wedge-shaped moving block can move reciprocally such that the volume of the gap cavity is a on a changing cycle from small to large to small again.

In some embodiments, the relative motion between the incubation cover and the incubation tank is horizontal and vertical mixed motion.

In some embodiments, the incubation cover comprises side panels having protrusions on their outside wall that are wedge-shaped and extending along the path of their moving direction on the side walls of the incubation bank. Due to the size differential discussed previously, there is a gap cavity between the incubation cover and the incubation tank when the incubation cover and the incubation tank are engaged. Two opposing incubation tank side panels comprise wedged sidewalls that engages with the wedge-shaped protrusions on the side panels. The directions of the two wedges are the opposite. When the wedge-shaped protrusions move along the wedged sidewalls, the incubation cover can move up or down relative to the incubation tank, and the volume of the gap cavity can increase or decrease, thereby forcing the incubation/washing solution to flow over the western blotting membrane.

In some embodiments, the incubation cover comprises a magnetic metal plate on the flat panel; and the incubation tank comprises a electromagnetic coil underneak the sloped bottom. When the electric current flows periodically through the electromagnetic coil, the magnetic metal plate causes the incubation cover to move up and down relative to the incubation tank, thereby changing the volume of the gap cavity and forcing the incubation/washing solution to flow over the western blotting membrane.

In some embodiments, the incubation cover and the incubation tank are vertically arranged to serve as a incubation front wall and a incubation rear wall, respectively. The peripheries of the incubation front wall and the incubation rear wall after the above arrangement can be sealed with a skirt sealing film. The distance between the incubation front wall and the incubation rear wall can be changed by using external force so as to change the volume of the gap cavity.

The present disclosure uses relative motion between the incubation cover and the incubation tank to change the volume of the gap cavity, thereby forcing incubation/washing solution to flow over the western blotting membrane. The present disclosure can solve the problem of how to efficiently mix an incubation/washing solution within a small space and how to use smaller volume of the incubation/washing solution to incubate the western blotting membrane, thereby completing the blotting process with reduced amount of the antibodies.

The following are examples and figures that explain the operation of the present disclosure. The examples are not necessary limiting by any means. The examples can have their variations.

Referring to FIGS. 1-4, a first embodiment of the assembly for incubation and washing of a western blot membrane according to the present disclosure includes an incubation cover 10 and an incubation tank 20, wherein a gap cavity for accommodating a western blot membrane 30 and solution is formed between the incubation cover 10 and the incubation tank 20. A relative movement between the incubation cover 10 and the incubation tank 20 can be generated to change a volume of the gap cavity, which in turn drives the solution in the gap cavity to squeeze the solution into and out of the gap cavity, so as to flow the solution over the surface of the western blot membrane 30.

Figure 2:
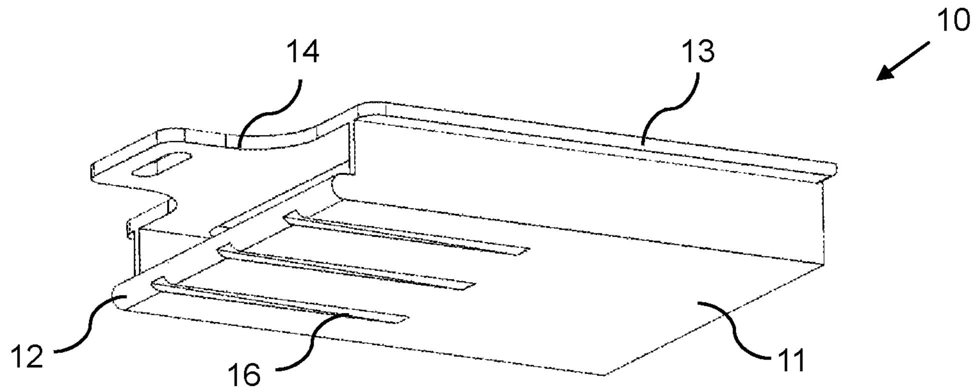
FIG. 2 is a schematic partial view of an example incubation cover of the present disclosure.
Figure 12:
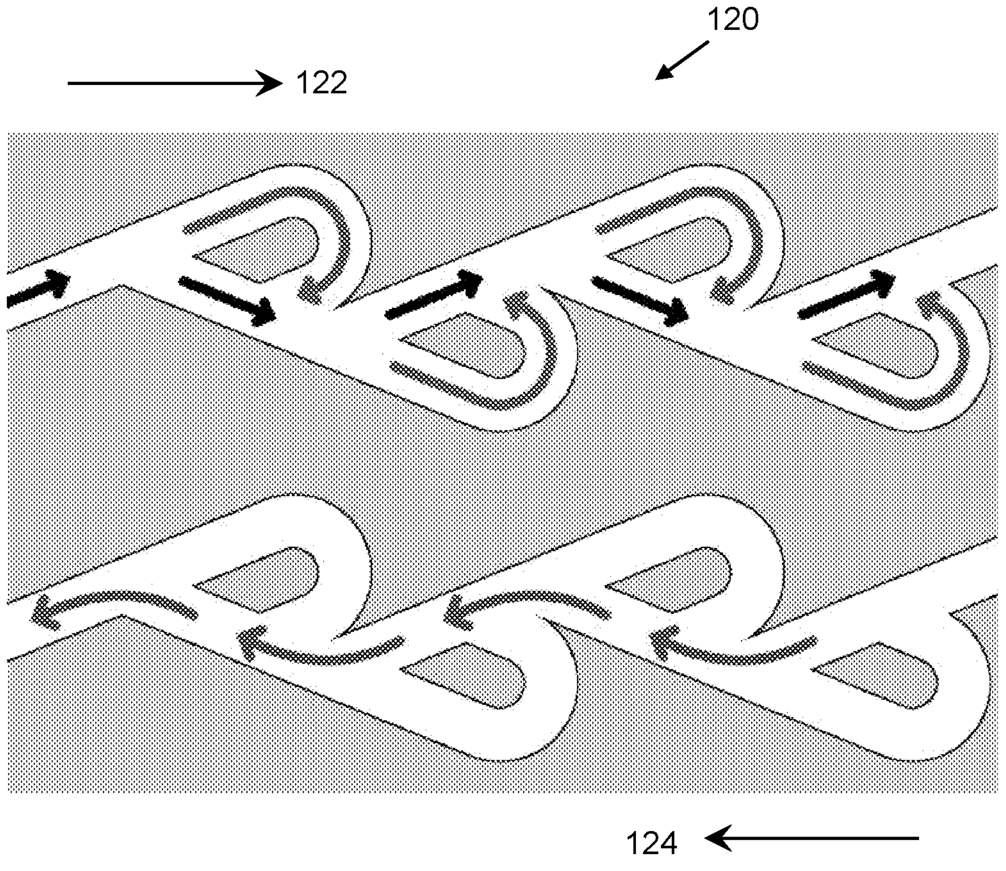
FIG. 12 is a schematic diagram of an example Tesla Valve design for the water channel of the present disclosure.
Figure 13:
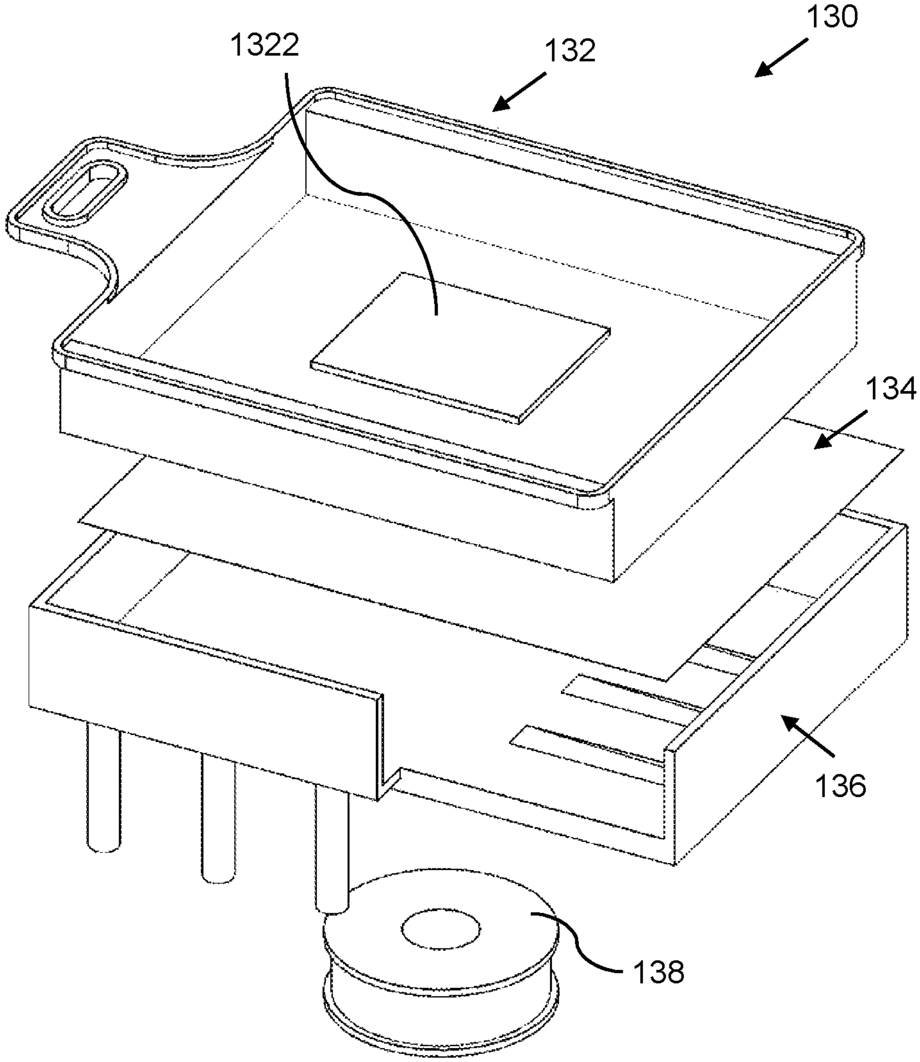
FIG. 13 is a schematic diagram showing a fifth example incubation assembly of the present disclosure.

The bottom part of the incubation cover 10 is a flat panel 11. On the left end of the flat panel 11 is a convex-shaped head part 12 (FIGS. 1 and 2). On the two opposing sides of the flat panel 11 are two opposing side panels with widened edges 13 extending upwards and vertically. The widened edge are distal to the flat panel. A traction hole section 14 connects the two opposing side panel with widened edge 13. There is a traction hole 141 on the traction hole section 14. An eccentric shaft 15 engages with the traction hole 141 and moves the incubation cover horizontally. On the bottom surface of the flat panel 11 facing the incubation tank 20 are one or more first water channels 16. Optionally, the one or more water channels 16 comprise shapes according to Tesla valve design (FIGS. 2 and 12). The incubation cover can have two or four vertical walls. When having two vertical walls, the open design allows solution poured from above to reach the incubation tank below the incubation cover via the gap cavity.

Figure 3:
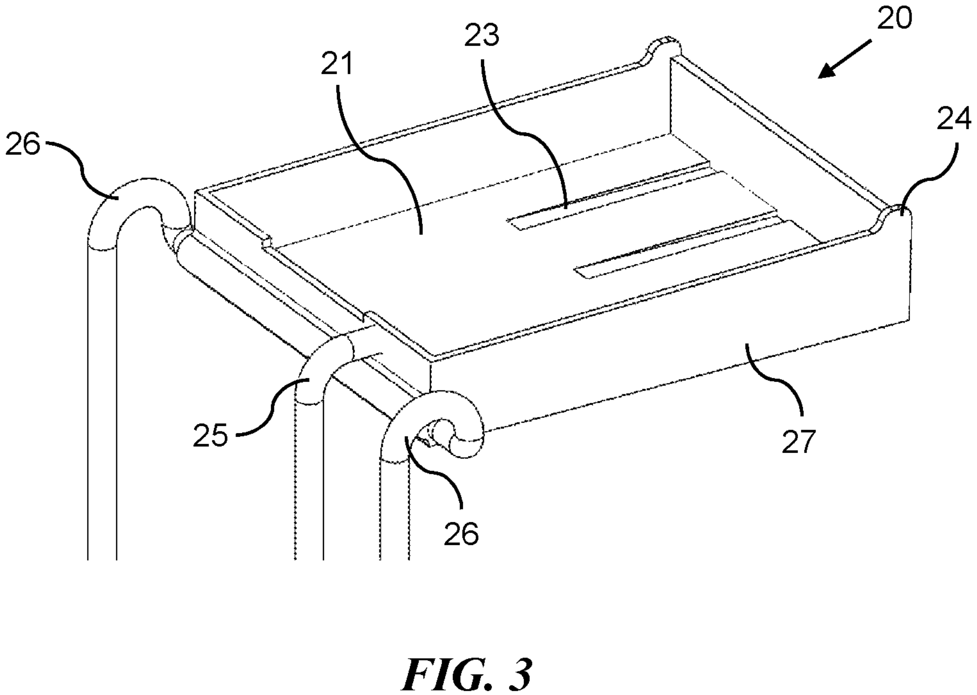
FIG. 3 is a schematic diagram of an example incubation tank of the present disclosure.

The incubation tank 20 is of a groove-shaped structure with an opening at the top. The incubation tank comprises a sloped bottom 21 (FIGS. 1 and 3). One or more second water channel 23 are arranged on the top surface of the sloped bottom 21 facing the incubation cover. The left side of the sloped bottom 21 comprises a concave-shaped head 22 corresponding to the convex-shaped head 12 of the incubation cover 10. The concave-shaped head 22 can receive and accommodate the convex-shaped head 12 without both stuck in a locked position. This can be done by making sure the concave shape and the convex shape are a mismatch. A solution inlet 25 and a solution outlet 26 are arranged at the left lower position of the sloped bottom 21 (FIG. 2). The incubation comprise four vertical side panels rising above the sloped bottom. Two of the opposing vertical side panels are incubation tank side panels 27. The upper edge of the incubation tank side panel 27 is substantially parallel to the slope of the sloped bottom 21. There is a side edge protrusion 24 on the top edge at the corner of the incubation tank distal to the sloped bottom and opposite of the traction hole.

Figure 4A:
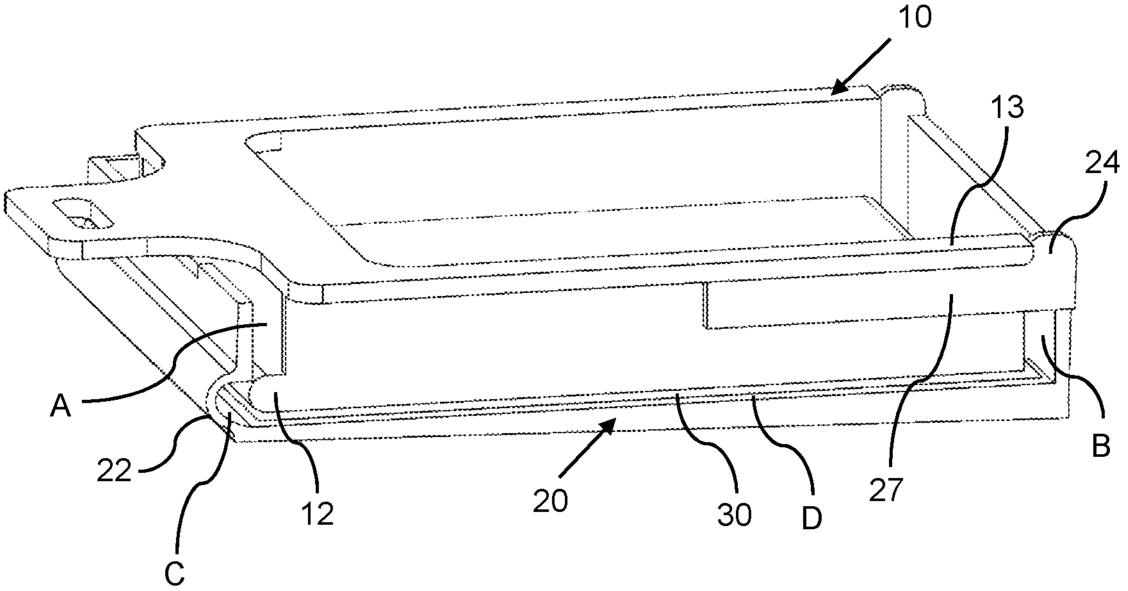
FIG. 4A-4C is a diagram showing the different positions of an incubation cover relative to an incubation tank.

The incubation cover 10 may be positioned in a incubation tank 20. The dimensions of the incubation cover 10 is smaller than the dimensions of the incubation tank 20 such that the incubation cover can be inserted into the incubation tank. The length and width of the incubation cover 10 are slightly shorter than the length and width of the incubation tank 20, respectively. Thus, after the incubation cover 10 is inserted into the incubation tank 20, the incubation cover 10 can be allowed to move left and right. The side panel with widened edge 13 of the incubation cover 10 can engage with and rest on the upper edge of the incubation tank side panel 27 of the incubation tank 20, so that the bottom surface of the flat panel 11 of the incubation cover 20, the top surface of the sloped bottom 21 of the incubation tank 20, and the adjacent incubation tank side panels 27 can form a dynamic variable-volume gap cavity. The gap cavity can receive and accommodate the protein blotting membrane 30. The height of the gap cavity may be the difference between the height of the incubation cover and the depth of the incubation tank 20. By choosing predetermined heights for the incubation cover and the depth of the incubation tank, the volume of the gap cavity can be predetermined as a result. As shown in FIG. 4A, the gap cavities include a front cavity A and a rear cavity B formed by the incubation cover 10 and the incubation tank 20 at a front-rear interval. Additionally, a head cavity C is formed between the convex-shaped head 12 of the incubation cover and the concave-shaped head 22 of the incubation tank 20. A bottom cavity D is formed between the flat panel 11 of the incubation cover 10 and the sloped bottom 21 of the incubation tank 20.

Figure 4B:
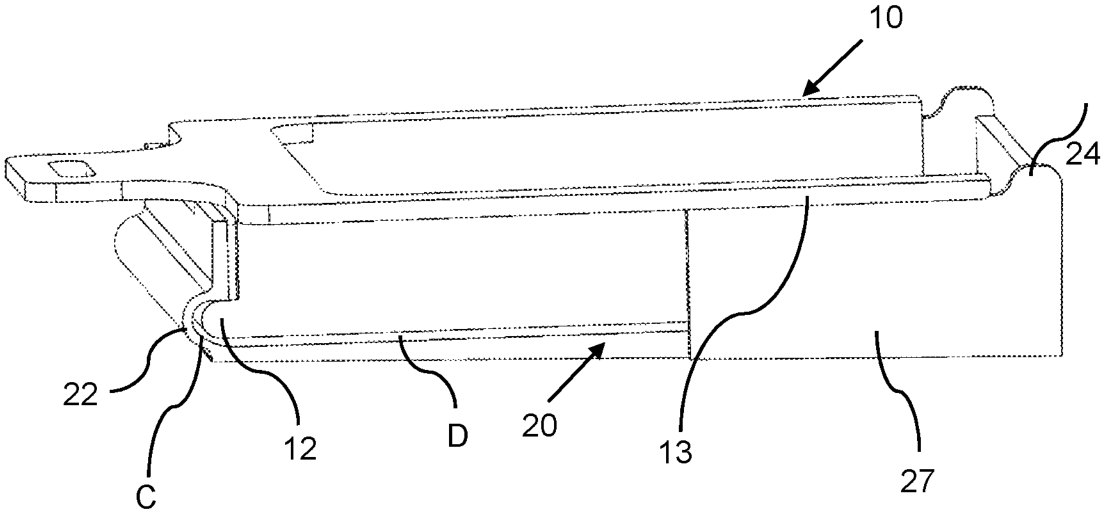
Figure 4C:
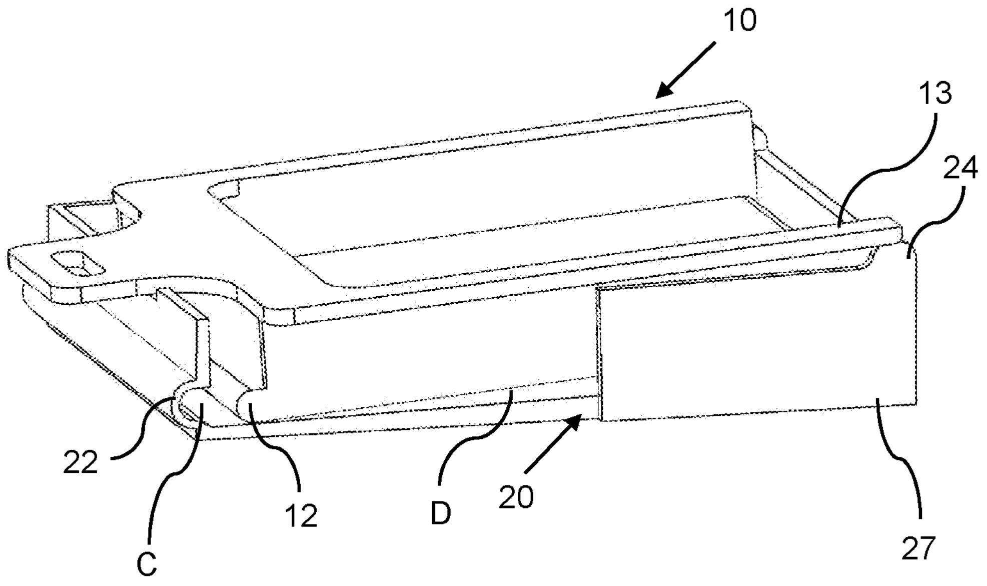

The convex-shaped 12 of the incubation cover 10 and the concave-shaped head 22 of the incubation tank 20 can form a head cavity C therebetween, as shown in FIG. 4A. Such a structure is similar to a syringe chamber or an injection plunger, which can push fluid flowing around. When the incubation cover 10 moves to the left, the convex-shaped head 12 of the incubation cover 10 is inserted into the concave-shaped head 22 of the incubation tank 20, filling the head cavity C, as shown in FIG. 4B. When the solution is present, the solution stayed in the head cavity C is squeezed, and the solution flows along the gap cavity and along the first water channel 16 at the bottom of the incubation cover 10, so that the solution is pushed to flow over the surface of the western blotting membrane 30. Then, when the incubation cover 10 moves to the right, the convex-shaped head 12 of the incubation cover 10 exits the concave-shaped head 22 of the incubation tank 20, leaving the head cavity C free of disturbance, as shown in FIG. 4C. When the solution is present, a negative pressure is generated in the head cavity C, and the solution may be sucked in, thereby the solution is forced to flow by the one or more first water guide channel 23 on the incubation tank 20 to push the western blotting membrane 30 to move to the upper left side.

When the incubation cover 10 continues to move to the right side, the right side end of the lower edge of the flank 13 of the incubation cover 10 is further jacked up by the side edge protrusion 24 on the washing tank side plate 27 of the incubation tank 20, as shown in FIG. 4C, so that the gap cavity is enlarged, the negative pressure attracts a large amount of solution to flow back, and the western blotting membrane 30 moves to the left side along with the flow back. When the incubation cover 10 is reversely moved out to the left, the incubation cover 10 falls down to press out the solution again, and the western blot membrane 30 moves along with the flow to the right. The backflow in the mode enables the flow rate of the solution to be large, and the solution is easy to be uniformly mixed.

Figure 5:
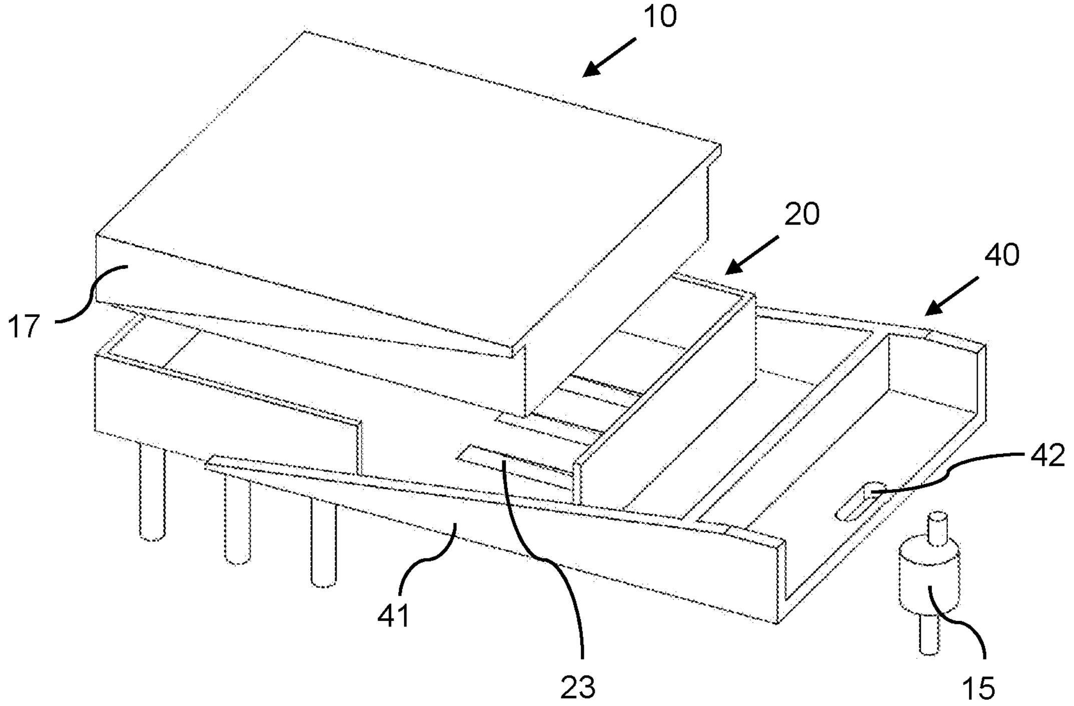
FIG. 5 is a schematic diagram showing a second example incubation assembly of the present disclosure.

Referring to FIG. 5, a second embodiment of the assembly for incubation and washing of a western blot membrane according to the present disclosure comprises an incubation cover 10 and an incubation tank 20, which, similar to the first embodiment, also causes the jet to push the western blot membrane by changing the size of the interstitial cavity. In this embodiment, the incubation cover further comprises a wedge-shaped reciprocating moving block 40 used in cooperation with the incubation cover 10, the outer side edge of the side wing of the incubation cover 10 extends downwards to form a side wedge-shaped wing 17, a gap cavity is formed between the incubation cover 10 and the incubation tank 20 after the upper and lower buckling, two sides of the wedge-shaped reciprocating moving block 40 are provided with wedge-shaped sidewalls 41 corresponding to the side wedge-shaped wing 17 of the incubation cover 10, the wedge-shaped sidewalls 41 of the wedge-shaped reciprocating moving block 40 are located below the side wedge-shaped wings 17, the eccentric shaft 15 is used for pushing the wedge-shaped reciprocating moving block 40 to move left and right, the wedge-shaped sidewalls 41 of the wedge-shaped reciprocating moving block 40 push the side wedge-shaped wings 17 to drive the incubation cover 10 to move upwards when moving leftwards, the side wedge-shaped side wings 17 lose the support of the wedge-shaped sidewalls 41 to cause the incubation cover 10 to move downwards under the action of gravity, that is moved leftwards by the wedge-shaped reciprocating moving of the wedge-shaped reciprocating moving block 40 to cause the incubation cover 10 to move upwards and downwards in the incubation tank 20, thereby causing the volume change of the gap cavity. The volume change generates solution jet flow, the solution impacting the protein blotting membrane 30 along the water guide channel 23 of the incubation tank 20 is uniformly mixed, and the protein blotting membrane 30 is fully and uniformly incubated. In another embodiment, a magnetically conductive metal sheet can be installed on the incubation cover 10, and an electric coil can be installed under the incubation tank 20, when the electric coil is intermittently electrified, the electric coil can cause the incubation cover 10 to move up and down, and then the water flow in the gap cavity is driven to move, which is beneficial to the full mixing of the solution.

Figure 6:
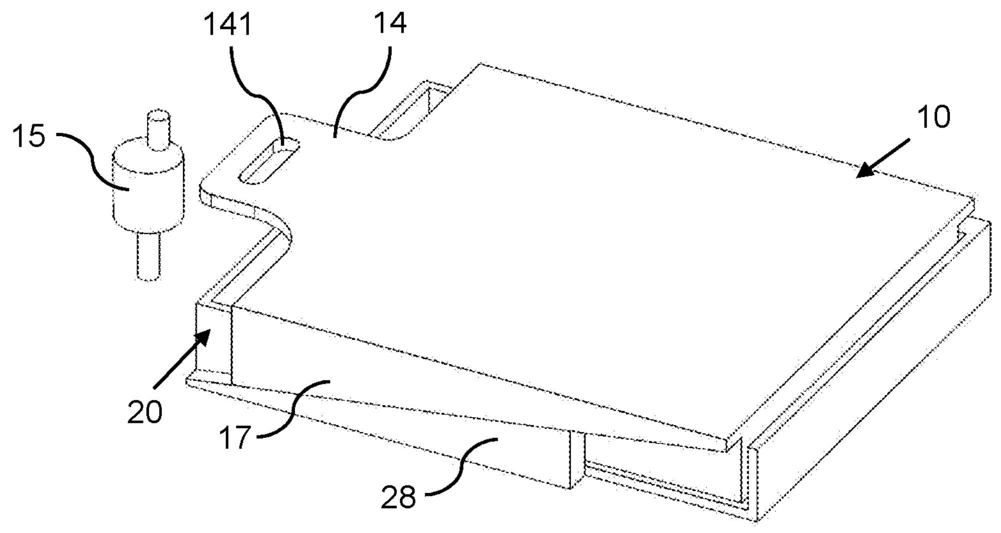
FIG. 6 is a schematic diagram showing a third example incubation example assembly of the present disclosure.

Referring to FIG. 6, a third embodiment of the assembly for incubation and washing of a western blotting membrane according to the present disclosure includes a incubation cover 10 and an incubation tank 20, which is similar to the first embodiment, and is also configured to cause a jet to push the western blotting membrane by changing the size of the interstitial cavity. In this embodiment, the incubation/washing lid 10 and the incubation/washing tank 20 are moved in a combination of vertical and horizontal directions.

As shown in FIG. 6, the outer side edge of the lateral wing of the incubation cover 10 extends downwards to form a lateral wedge-shaped wing 17, a gap cavity is formed between the incubation cover 10 and the incubation tank 20 after the upper and lower buckling, and a wedge-shaped side plate 28 matched with the wedge-shaped wing 17 is arranged on the lateral side of the incubation washing tank 20. When the eccentric shaft 15 drives the incubation cover 10 with the side wedge-shaped wings 17 to move left and right, the incubation cover 10 moves up and down simultaneously, so that the size and the position of the gap cavity are changed. As the volume of the gap cavity changes and the position moves, solution jet flow is generated, the solution impacts the protein blotting membrane 30 along the water guide channel 23 of the incubation washing tank 20, the solution is uniformly mixed, and the protein blotting membrane 30 is fully and uniformly incubated.

Figure 7:
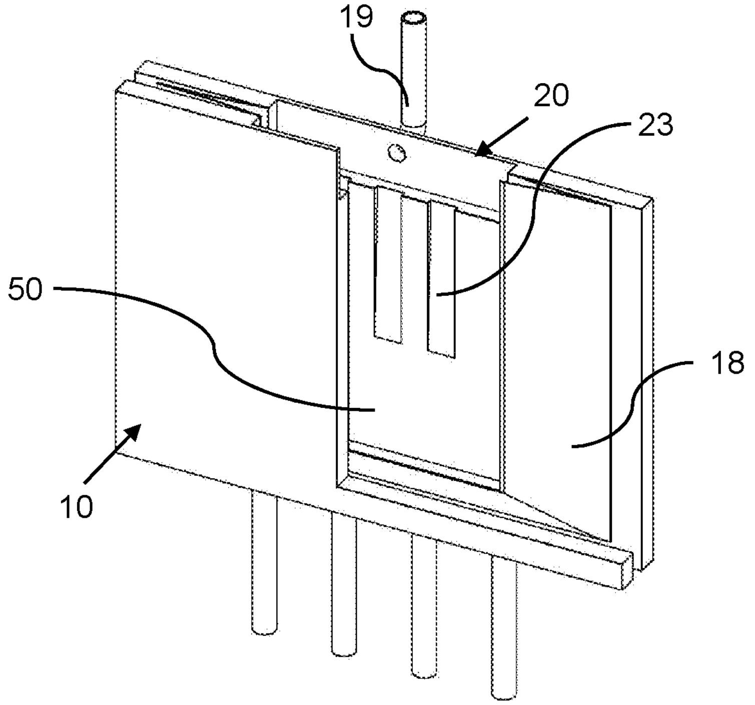
FIG. 7 is a schematic diagram showing a fourth example incubation assembly of the present disclosure.

FIG. 7 shows a fourth embodiment of the module for incubation and washing of western blot membrane according to the present disclosure, which is formed by arranging the above-described jet incubation and washing device in vertical position and performing the evolution by using a topological method. That is, the jet incubation wash lid 10 and the jet incubation wash tank 20, the front wall of the evolving jet incubation wash and the back wall of the evolving jet incubation wash. The jet incubation wash lid 10 and the jet incubation wash tank 20 are mated and the perimeter is enclosed by the perimeter of the gap cavity 50 using a skirt seal membrane 18. The skirt sealing membrane 18 is of a stacked skirt structure and is made of an expandable, compressible and retractable plastic film material. The skirt seal membrane 18 encloses the periphery of the gap cavity 50, thus forming an upstanding gap cavity. The distance between the front wall of the jet incubation washing and the rear wall of the jet incubation washing is changed by external force, which also causes the volume of the interstitial cavity to change, and also generates jet flow, impacting the western blotting membrane 30. When required, the opening at the upper part of the gap cavity can be provided with an openable structure, so that the bag opening can be opened or closed for sealing. The purpose that the front wall of the washing is incubated by the jet flow and the rear wall of the washing is incubated by the jet flow and moves mutually is achieved through the air pump port 19 arranged at the upper part and through the change of air pressure.

Figure 8:
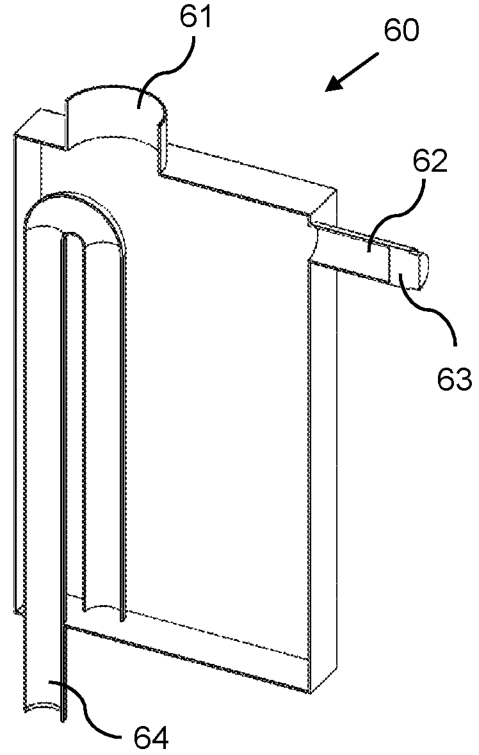
FIG. 8 is a cross-sectional view of an example antibody container of the present disclosure.

In order to realize a fully automatic incubation and washing process of the protein blotting membrane, the storage and transportation of various solutions need to be considered. FIG. 8 shows an antibody container 60 that can draw or suck in the antibody solution in the container by the positive and negative pressure change induced by the air vents 62. In the absence of pressure, the antibody container 60 may hold a solution. The gas vent 62 is connected to a positive pressure to allow solution to exit the container, and the gas vent 62 is connected to a negative pressure to allow solution to be drawn into the container.

Figure 9:
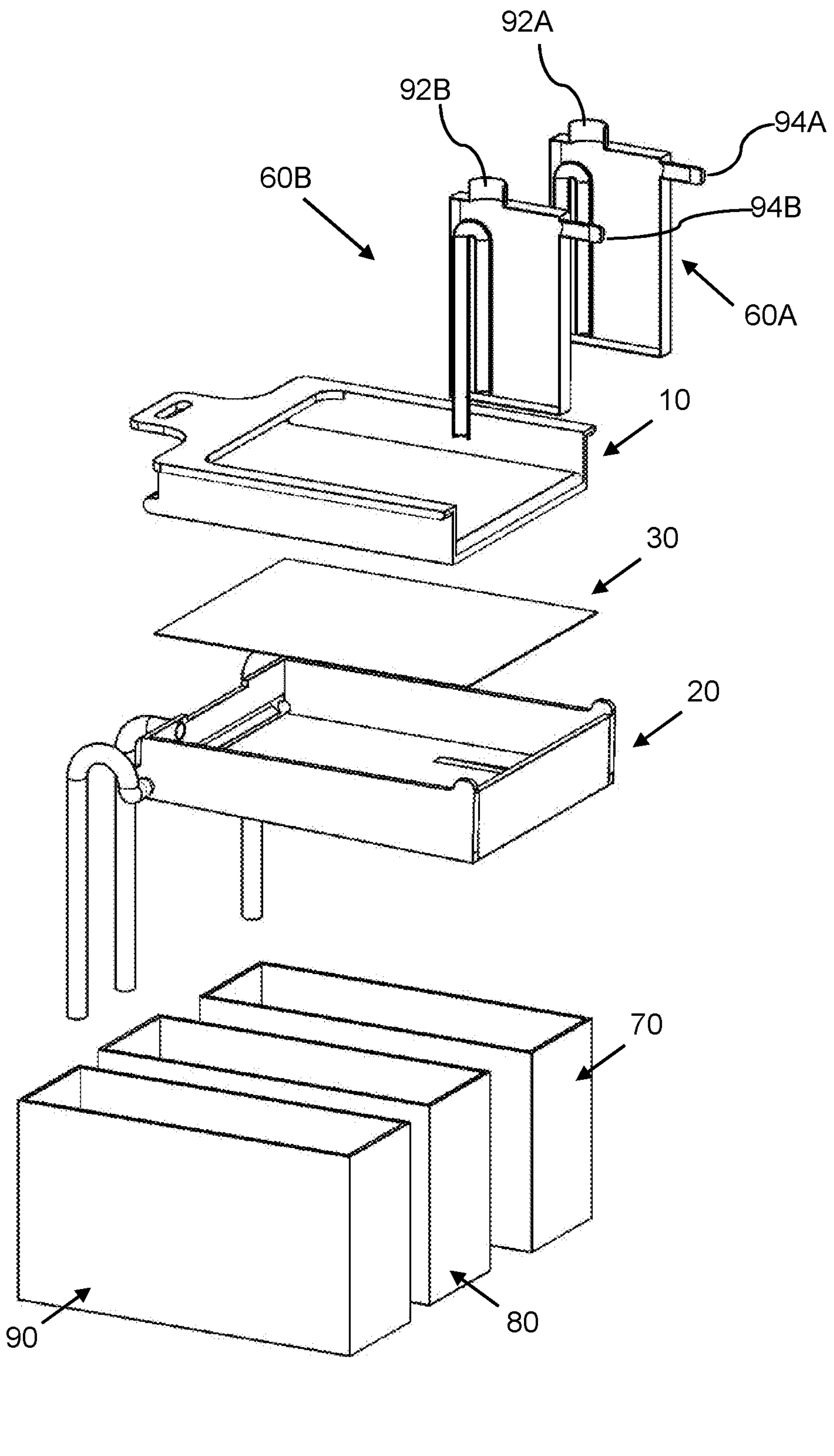
FIG. 9 is a schematic diagram of an application of the first example in FIG. 1.

As shown in FIG. 9, the incubation cover 10, the incubation tank 20, the matching antibody container 60 including the first antibody container 60A and the second antibody container 60B, the antibody recovery container 70, the washing solution container 80, the waste solution container 90, the peristaltic pump (connected to the solution inlet and the solution outlet of the incubation tank 20), the conduit, and the like are used to implement a complete western blot membrane incubation washing system. The first antibody container 60A comprises a solution inlet 92A and a gas pump connector 94A. The second antibody container 60B comprises a solution inlet 92B and a gas pump connector 94B.

Figure 10:
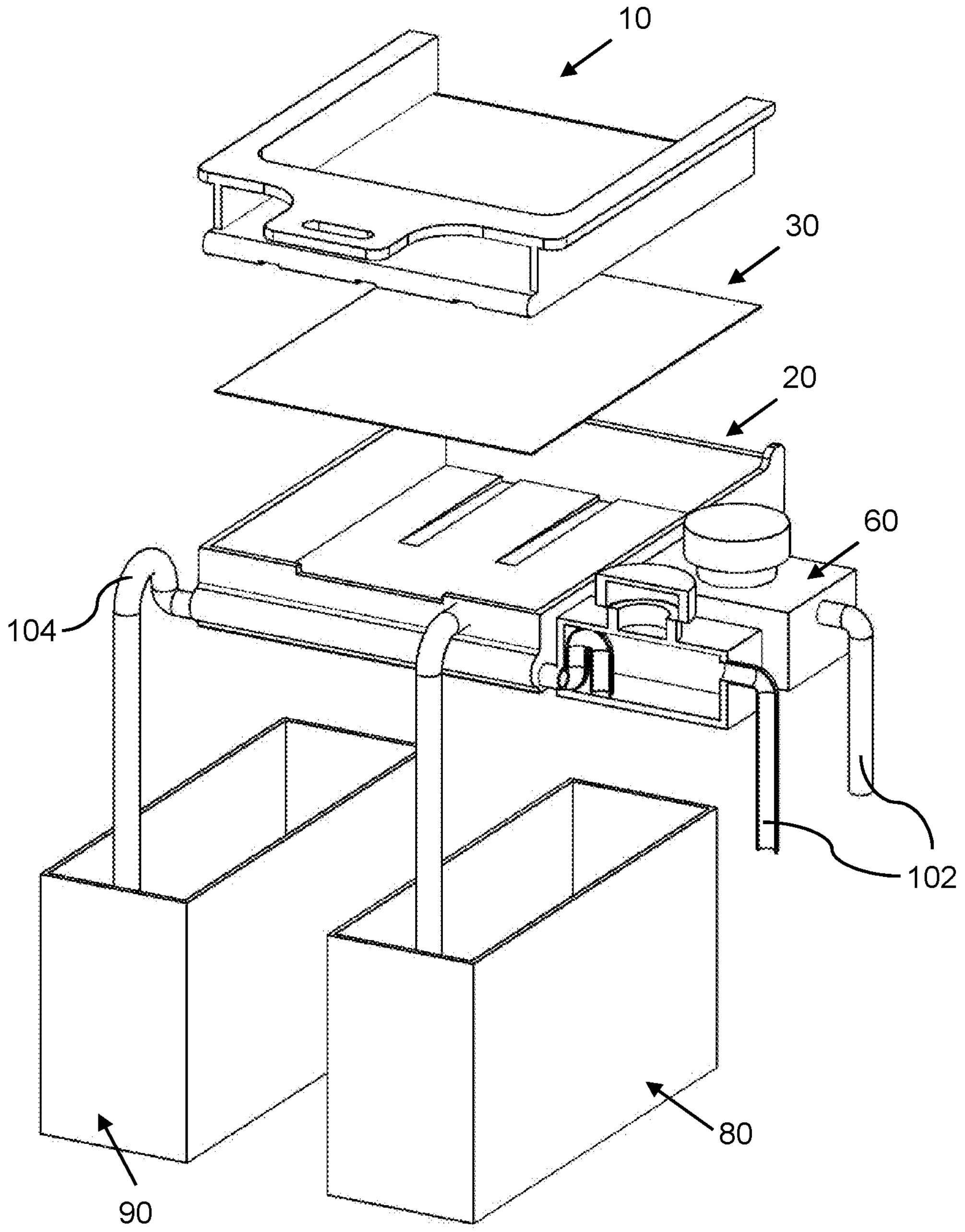
FIG. 10 is a schematic diagram of another application of the first example in FIG. 1.

The antibody container 60 may also be integrated with the jet incubation wash tank 20 as shown in FIG. 10. FIG. 10 shows another configuration of the incubation cover 10, the incubation tank 20, the western blotting membrane 30, the matching antibody container 60, the washing solution container 80, and the waste solution container 90. Additionally, each of the antibody container 60 comprises an air pump connector 102. The incubation tank 20 comprises a solution outlet 104.

Figure 11:
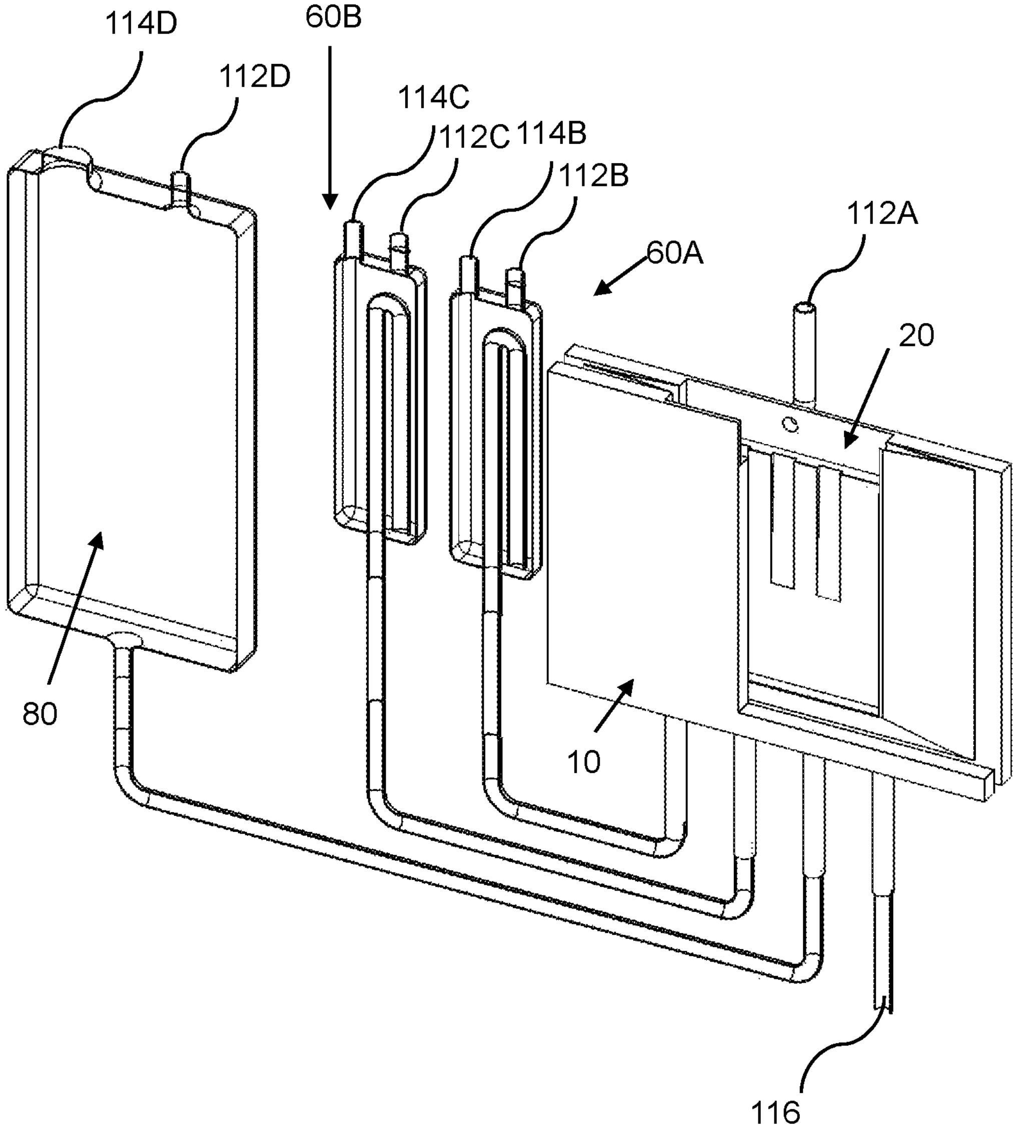
FIG. 11 is a schematic diagram of an application of the fourth example in FIG. 6.

It is also possible to construct a compact western blot membrane incubation washing system by integrating the washing solution containers 80 in an erect arrangement as shown in FIG. 11.

The water guide passage in the above embodiment may be a one-way water guide passage based on the Tesla valve principle. As shown in FIG. 12, a Tesla valve-shaped water channels 120 is shown. The top water channel describes the flow dynamic of fluid in the channel in the first flow direction 122. The bottom water channel describes the flow dynamic of fluid in the channel in the second flow direction 124. The flow in the first flow direction 124 receives much less resistance than the flow in the second flow direction 122, thereby creating a one-way water flow in the water channel.

The working principle of the western blot membrane incubation washing system composed of the components of the present disclosure is illustrated in several examples.

The first implementation example is as follows: and (3) respectively setting each component to finish protein incubation and washing.

As shown in FIG. 9, the first antibody container and the second antibody container are disposed above the incubation cover 10 and the incubation tank 20, and an air pump, a peristaltic pump, a tube, a washing solution container 80, an antibody recovery container 70, and a waste solution container 90 are disposed.

(1) Placing the closed protein blotting membrane 30 in a incubation tank 20 by an operator, and installing a incubation cover 10;

(2) Starting the machine;

(3) Program control, pressurizing through an air pump, pressing the first antibody into the incubation tank 20, and dragging the incubation cover 10 by the eccentric wheel to do reciprocating motion with rhythm. The incubation cover 10 extrudes or sucks incubation washing solution to generate jet flow, so that the incubation washing solution is uniformly mixed, and the protein blotting membrane 30 is fully incubated;

(4) After the incubation is completed, the first antibody is injected into the waste solution container 90 by a peristaltic pump (not shown);

(5) Pumping incubation washing solution by a peristaltic pump (not shown), repeatedly moving the incubation cover 10 to generate jet flow, cleaning the western blotting membrane 30, and pumping the used solution into the waste solution container 90 by the peristaltic pump (not shown);

(6) The washing was repeated three times.

(7) Program control, pressurizing by air pump, and pressing the secondary antibody into the jet incubation wash tank. The eccentric wheel pulls the jet flow to incubate the washing cover 10, and the washing cover reciprocates rhythmically. The incubation cover 20 extrudes or sucks the incubation washing solution to generate jet flow, so that the incubation washing solution is uniformly mixed, and the western blotting membrane is fully incubated.

(8) After incubation is complete, the secondary antibody is pumped by a peristaltic pump (not shown) into waste container 90:

(9) The peristaltic pump (not shown) pumps the incubation washing solution, and the incubation cover 10 moves repeatedly to generate jet flow, so that the western blotting membrane 39 is cleaned. The spent solution is pumped into the waste container 90 by a peristaltic pump (not shown).

(10) Washing was repeated three times;

(11) The wash solution was pumped in again, and the western blots were soaked in solution for 30 bubbles to wait for further processing by the laboratory.

Example two was performed: first and second antibody containers are integrated into the jet incubation wash tank 20, and the antibodies are output and recovered using positive and negative pressure pumps.

As shown in FIG. 10, the jet flow incubation/washing tank 20 is integrated with a first antibody container and a second antibody container, and a positive/negative pressure air pump, a dynamic pump, a conduit, a washing solution container 80, and a waste solution container 90 are provided.

(1) An operator places the closed protein blotting membrane 30 in the incubation tank 20 and installs the incubation cover 10;

(2) Starting the machine;

(3) Program control, pressurizing through an air pump, pressing the first antibody into a incubation tank 20, and driving incubation by an eccentric wheel 10 to do reciprocating motion with rhythm. The incubation cover 10 extrudes or sucks the incubation washing solution to generate jet flow, so that the incubation washing solution is uniformly mixed, and the western blotting membrane 30 is fully incubated;

(4) After completion of the incubation, the primary antibody is sucked back into the primary antibody container by a negative pressure pump (not shown);

(5) The peristaltic pump (not shown) pumps the incubation wash, the jet incubation wash cap 10 is moved repeatedly to generate a jet that cleans the western blot membrane 30, and the used solution is pumped into the waste solution container 90 by the peristaltic pump (not shown).

(6) Washing was repeated three times;

(7) Program control, pressurizing through an air pump, and pressing the second antibody pressure incubation tank 20, wherein the eccentric wheel drives the incubation cover 10 to do reciprocating motion rhythmically. The incubation cover 10 extrudes or sucks incubation washing solution to generate jet flow, so that the incubation washing solution is uniformly mixed, and the protein blotting membrane 30 is fully incubated;

(8) After incubation is complete, the secondary antibody is aspirated back into the secondary antibody container by a negative pressure pump (not shown)

(9) A peristaltic pump (not shown) pumps incubation wash from wash reservoir 80 and the jet incubation wash cap 10 is moved repeatedly to generate a jet to clean the western blot membrane 30 and the used fluid is pumped into waste reservoir 90 by peristaltic pump (not shown).

(10) Repeating for three times;

(11) The wash solution was pumped in again, and the western blot membrane was soaked in solution for further processing by the laboratory.

Example three was implemented: the vertical gap cavity formed by the front wall of the incubation and the rear wall of the incubation is integrated with the antibody container 50 and the washing solution container 80 into a flat object. And outputting and recovering the antibody by using a positive and negative pressure pump, and driving the incubation front wall and the incubation rear wall to move by using positive and negative pressure.

As shown in FIG. 11, the vertical gap cavity formed by the front wall of the jet incubation wash and the rear wall of the jet incubation wash is integrated with the first antibody container, the second antibody container, and the wash solution container 80. An air pump, a peristaltic pump, a conduit and a waste solution container are arranged. As shown in FIG. 11, another configuration can have the incubation cover 10, the incubation tank 20, the matching antibody container 60A and 60B, and the washing solution container 80. Also shown are the air pump connectors 112A-112D, the solution inlet 114B-114D, and a waste outlet 116.

(1) Opening a sealing opening on a vertical gap cavity formed by the front wall of the incubation and the rear wall of the incubation, placing the closed western blot membrane 30 in the gap cavity by an operator, and closing the sealing opening;

(2) Starting the machine;

(3) Program control, pressurizing by an air pump, pressing the first antibody into a vertical gap cavity formed by the front wall of the incubation and the rear wall of the incubation;

(4) The air pump alternately supplies air to the positive pressure and the negative pressure in the vertical gap cavity formed by the incubation front wall and the incubation rear wall, and the volume of the vertical gap cavity formed by the incubation front wall and the incubation rear wall is repeatedly changed. Generating jet flow in a vertical gap cavity formed by the front incubation wall and the rear incubation wall, so that incubation washing solution is uniformly mixed, and the western blotting membrane is fully incubated;

(5) After the incubation is finished, the first antibody is recovered to a first antibody container through a negative pressure pump;

(6) A peristaltic pump (not shown) pumps the incubation wash;

(7) The air pump supplies air alternately under positive and negative pressure to the vertical gap cavity formed by the front incubation wall and the rear incubation wall. The volume of the vertical gap cavity formed by the front wall of the jet incubation washing and the rear wall of the jet incubation washing is repeatedly changed. And generating jet flow in a vertical gap cavity formed by the incubation front wall and the incubation rear wall, so that incubation washing solution is uniformly mixed, and the western blotting membrane is fully incubated.

(8) The used solution is pumped into a waste container by a peristaltic pump (not shown);

(9) The washing was repeated three times.

(10) Program control, pressurizing by an air pump, pressing a second antibody into a vertical gap cavity formed by the front wall of the incubation and the rear wall of the incubation;

(11) The air pump supplies air alternately to the vertical gap cavity formed by the front wall of the incubation and the rear wall of the incubation. The volume of the vertical gap cavity formed by the front wall of the jet incubation washing and the rear wall of the jet incubation washing is repeatedly changed. Generating jet flow in a vertical gap cavity formed by the front incubation wall and the rear incubation wall, so that incubation washing solution is uniformly mixed, and the western blotting membrane is fully incubated;

(12) After the incubation was completed, the secondary antibody was recovered to the secondary antibody container by a negative pressure pump;

(13) A peristaltic pump (not shown) pumps the incubation wash;

(15) The air pump supplies air alternately under positive and negative pressure to the vertical gap cavity formed by the front incubation wall and the rear incubation wall. The volume of the vertical gap cavity formed by the front wall of the jet incubation washing and the rear wall of the jet incubation washing is repeatedly changed. Generating jet flow in a vertical gap cavity formed by the front incubation wall and the rear incubation wall, so that incubation washing solution is uniformly mixed, and the western blotting membrane is fully incubated;

(16) The used solution is pumped into a waste container by a peristaltic pump (not shown);

(17) Washing was repeated three times;

(18) The wash solution was pumped in again, and the western blots were soaked in solution for 30 bubbles to wait for further processing by the laboratory.

In view of the water-saving mode of direct contact in the incubation and washing of the open box type shaking blotting membrane, the invention changes the fixation of the box wall in the plastic box type method into the contact surface of the real-time dynamically adjustable western blotting membrane, and solves the problem of how to uniformly mix the solution in a narrow space at one stroke. From the new angle, the western blotting membrane can be soaked comprehensively, the incubation washing solution can be fully mixed, and less incubation washing solution can be used for soaking the western blotting membrane comprehensively. Thus, the amount of incubation wash solution is reduced to less.

EMBODIMENTS

Embodiment 1. An assembly for incubation washing of a western blot membrane, comprising: the incubation cover and the incubation tank form a gap cavity for containing a protein blotting membrane and solution, the incubation cover and the incubation tank can move relatively to change the volume of the gap cavity, and the change of the volume drives the solution in the gap cavity to extrude the solution to flow into and out of the gap cavity so as to form solution jet flow to impact the protein blotting membrane.

Embodiment 2. The module for western blot membrane incubation washing of claim 1, wherein: washing lid lower part is hatched to the efflux is the plane board, and the both sides of lower part plane board upwards vertically extend to outside extension and form the flank that washing lid was hatched to the efflux, the washing tank is hatched to the efflux is upper portion open-ended slot-shaped structure, and the bottom is equipped with a domatic tank bottom, and the flank that washing lid was hatched to the efflux is followed the contact cooperation efflux and is hatched the washing tank curb plate upper edge of washing tank down, makes the efflux hatch washing lid lower surface and the efflux hatch the sloping groove bottom surface of washing tank and adjacent washing tank curb plate constitute dynamic variable volumetric clearance chamber.

Embodiment 3. The module for western blot membrane incubation washing of claim 1, wherein: and water guide channels are arranged on the bottom of the incubation cover and the slope tank bottom. The water guide channel is a one-way water guide channel based on the Tesla valve principle.

Embodiment 4. The module for western blot membrane incubation washing of claim 2, wherein: the relative motion between the incubation cover and the incubation tank is horizontal movement.

Embodiment 5. The module for western blot membrane incubation washing of claim 4, wherein: the left side of washing lid lower part is hatched to the efflux is equipped with the protruding head of rectangular shape along the side, and the left side of domatic tank bottom corresponds the protruding head that washing lid was hatched to the efflux is equipped with a head of rectangular shape sunken, and protruding head can imbed in the head is sunken.

Embodiment 6. The module for western blot membrane incubation washing according to claim 5, wherein: the upper right tail part of the side plate of the washing tank is provided with a side edge bulge, when the incubation cover continues to move towards the right side, the right side end of the lower edge of the side wing of the incubation cover is further jacked up by the side edge bulge on the side plate of the washing tank of the incubation tank, so that the gap cavity is enlarged.

Embodiment 7. The module for western blot membrane incubation washing of claim 2, wherein: the relative motion that takes place between the washing lid is incubated to the efflux and the washing groove is incubated to the efflux is vertical removal.

Embodiment 8. The module for western blot membrane incubation washing of claim 7, wherein: the incubation cover and the incubation tank are buckled up and down to form a gap cavity, the two sides of the wedge-shaped reciprocating moving block are provided with wedge-shaped sidewalls corresponding to the side wedge-shaped wings of the incubation cover, and when the wedge-shaped reciprocating moving block is pushed to move left and right, the wedge-shaped sidewalls of the wedge-shaped reciprocating moving block push the side wedge-shaped wings to drive the incubation cover to move up and down, namely the incubation cover is driven to move up and down in the incubation tank, so that the volume change of the gap cavity is caused.

Embodiment 9. The module for western blot membrane incubation washing of claim 2, wherein: the relative motion between the incubation cover and the incubation tank is horizontal and vertical compound motion.

Embodiment 10. The module for western blot membrane incubation washing of claim 9, wherein: the incubation cover is characterized in that the outer side edge of the side wing of the incubation cover extends downwards to form a side edge wedge-shaped wing, a gap cavity is formed between the incubation cover and the incubation tank after the incubation cover and the incubation tank are buckled up and down, a wedge-shaped side plate matched with the wedge-shaped wing is arranged on the side edge of the incubation washing tank, and when the incubation cover with the side edge wedge-shaped wing is driven to move left and right, the incubation cover also moves up and down simultaneously, so that the volume change and the position of the gap cavity are changed.

Embodiment 11. The module for western blot membrane incubation washing according to claim 7, wherein: the jet flow is hatched and is installed the magnetic conduction sheet metal on the washing lid, the electric coil is installed to jet flow hatching washing groove below, after the electric coil intermittent type circular telegram, leads to the jet flow to hatch the washing lid and move, drives the rivers motion in the clearance chamber then. See FIG. 13. This embodiment of the assembly 130 comprises the incubation cover 132, a magnetic metal plate 1322 on the incubation cover 132, a western blotting membrane 134, an incubation tank 136, and an electromagnetic coil 138.

Embodiment 12. The module for western blot membrane incubation washing of claim 1, wherein: the incubation cover and the incubation tank are vertically arranged and respectively used as a incubation front wall and a incubation rear wall, the incubation front wall and the incubation rear wall are combined, the peripheries of the gap cavity are surrounded by skirt sealing films, and the distance between the incubation front wall and the incubation rear wall is changed by using external force so as to change the volume of the gap cavity.

While preferred embodiments of the present disclosure have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. An assembly for incubating/washing a western blot membrane, comprising:

(i) an incubation tank, wherein the incubation tank comprises:

a sloped bottom; and four incubation tank side panels on top of the sloped bottom and enclosing a chamber with an opening;

(ii) an incubation cover configured to be inserted into the incubation tank through the opening, wherein the incubation cover comprises:

a flat panel on the bottom;

a front end of the flat panel further comprising a convex-shaped head; and two opposing side panels on top of and extending from the flat panel;

wherein the two opposing side panels comprise widened edges located on the distal end from the flat panel, wherein a bottom surface of the flat panel of the incubation cover further comprises one or more first water channels shaped as Tesla valve design; and (iii) a gap cavity formed between the incubation tank and the inserted incubation cover, the gap cavity being configured to enclose a western blot membrane and a solution;

wherein a relative motion between the incubation cover and the incubation tank is configured to change the volume of the gap cavity, wherein changing the volume of the gap cavity drives the solution into and out of the gap cavity, thereby flowing the solution over the western blot membrane.

2. The assembly of claim 1, wherein the tank side panels are configured to engaged with and hold the widened edges of the side panels of the inserted incubation cover, thereby forming the gap cavity enclosed by the bottom surface of the flat panel, a top surface of the sloped bottom and parts of the four incubation tank side panels.

3. The assembly of claim 2, wherein the top surface of the sloped bottom further comprises one or more second water channels.

4. The assembly of claim 3, wherein the one or more second water channels are further shaped as Tesla valve design.

5. The assembly of claim 2, wherein a front end of the sloped bottom further comprises a concave-shaped head, and wherein the concave-shaped head is configured to receive and accommodate the convex-shaped head.

6. The assembly of claim 5, wherein the incubation tank further comprises a side edge protrusion on the incubation tank side panel, distal to the sloped bottom and opposing the concave-shaped head, wherein the side edge protrusion is configured to move the incubation cover vertically.

7. The assembly of claim 1, wherein the relative motion is a vertical movement.

8. The assembly of claim 1, wherein the relative motion is a horizontal movement.

9. The assembly of claim 1, wherein the relative motion is a combination of horizontal movement and vertical movement.

10. The assembly of claim 1, wherein: the incubation cover is characterized in that an outer side edge of the side panel of the incubation cover extends downwards to form a side edge wedge-shaped wing, the gap cavity is formed between the incubation cover and the incubation tank after the incubation cover and the incubation tank are buckled up and down, a wedge-shaped side plate matched with the wedge-shaped wing is arranged on the side edge of the incubation tank, and when the incubation cover with the side edge wedge-shaped wing is driven to move left and right, the incubation cover also moves up and down simultaneously, so that the volume change and the position of the gap cavity are changed.

11. The assembly of claim 1, wherein: the incubation cover and the incubation tank are vertically arranged and respectively used as an incubation front wall and an incubation rear wall, the incubation front wall and the incubation rear wall are combined, the peripheries of the gap cavity are surrounded by skirt sealing films, and the distance between the incubation washing front wall and the incubation rear wall is changed by using external force so as to change the volume of the gap cavity.

* * * * *